(12) United States Patent
Gassner et al.

(10) Patent No.: US 9,052,503 B2
(45) Date of Patent: Jun. 9, 2015

(54) METHOD FOR THE OUTPUT OF GRAPHIC DRIVING INDICATIONS

(75) Inventors: Markus Gassner, Munich (DE); Axel Jansen, Munich (DE); Josef Schumann, Munich (DE); Robert Hein, Blonhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 162 days.

(21) Appl. No.: 13/426,231

(22) Filed: Mar. 21, 2012

(65) Prior Publication Data

US 2012/0249589 A1 Oct. 4, 2012

(30) Foreign Application Priority Data

Mar. 29, 2011 (DE) .......................... 10 2011 006 347

(51) Int. Cl.
*G09G 5/00* (2006.01)
*G02B 27/01* (2006.01)

(52) U.S. Cl.
CPC .......... *G02B 27/01* (2013.01); *G02B 2027/014* (2013.01); *G02B 2027/0141* (2013.01)

(58) Field of Classification Search
None
See application file for complete search history.

(56) References Cited

U.S. PATENT DOCUMENTS

| | | | | |
|---|---|---|---|---|
| 5,862,510 A * | 1/1999 | Saga et al. | ..................... | 701/455 |
| 6,700,505 B2 * | 3/2004 | Yamashita et al. | ............ | 340/988 |
| 2008/0195315 A1 * | 8/2008 | Hu et al. | ....................... | 701/212 |
| 2009/0222203 A1 * | 9/2009 | Mueller | ........................ | 701/211 |
| 2010/0153000 A1 * | 6/2010 | Akita et al. | ................... | 701/201 |
| 2010/0253593 A1 * | 10/2010 | Seder et al. | ....................... | 345/7 |
| 2010/0321170 A1 * | 12/2010 | Cooper et al. | ............. | 340/425.5 |
| 2011/0130950 A1 * | 6/2011 | Wexler et al. | ................ | 701/200 |

FOREIGN PATENT DOCUMENTS

| | | |
|---|---|---|
| DE | 103 54 641 A1 | 6/2005 |
| DE | 10 2004 048 347 A1 | 4/2006 |
| DE | 10 2006 054 323 A1 | 5/2008 |

OTHER PUBLICATIONS

Stefan VAcek et al. "Fusing image features and navigation system data for augmenting guiding information displays", in Proc. IEEE MFI, Heidelberg, Germany, 2006, pp. 323-328.*
YouTube video "bmw 528i head-up display" uploaded on Oct. 13, 2010 by bingohoon2 at http://www.youtube.com/watch?v=vymq0-WbhnE.*
German Search Report dated Nov. 2, 2011 including partial English-language translation (Ten (10) pages).

* cited by examiner

*Primary Examiner* — Joni Richer
*Assistant Examiner* — Yi Wang
(74) *Attorney, Agent, or Firm* — Crowell & Moring LLP

(57) ABSTRACT

The method outputs graphic driving indications for assisting a motor vehicle driver in a driving maneuver. The graphic driving indications are displayed by a head-up display. A first graphic driving indication is in the form of a traffic lane change indication pointing out to the driver the direction from a traffic lane traveled at the beginning of the maneuver to a desired traffic lane. A second graphic driving indication is output in the form of a contact-analog traffic lane marking graphically emphasizing the desired traffic lane relative to other traffic lanes. A third graphic driving indication is in the form of a contact-analog maneuvering impulse including a driving funnel originating from the desired traffic lane and corresponding to the driving maneuver. A fourth graphic driving indication is a symbolic maneuvering display indication which symbolically displays the beginning driving maneuver after the vehicle enters into the driving funnel.

15 Claims, 4 Drawing Sheets

METHOD FOR THE OUTPUT OF GRAPHIC DRIVING INDICATIONS

BACKGROUND AND SUMMARY OF THE INVENTION

The invention relates to a method for the output of graphic driving indications for assisting the driver of a motor vehicle when carrying out a driving maneuver. In the case of this method, the driving indications are displayed by a head-up display provided at the motor vehicle.

Head-up displays have been used in motor vehicles for some time for the output of symbolic graphic information (for example, traffic signs, current speed value, conventional turn-off arrow, street name, etc.) In addition to the representation of symbolic information, it is known to display certain information, particularly navigation information, by head-up displays also in a contact-analog manner.

Within the scope of this document, contact-analog information or display elements is information or are display elements which, in an accurate manner with respect to position and attitude, are inserted into the driver's current view such that the driver has the impression that this information or these display elements are part of the vehicle surroundings. The completely or partially covering or superimposing position-accurate and attitude-accurate fading-in of information or display elements therefore results in a supplementation or enrichment or enhancement of the image of the surroundings perceived by the driver. For example, a navigation arrow can be represented in a contact-analog manner as if it were "lying" directly on the road. Comparable display techniques are known from prior art for ranging bars which indicate the distance to the vehicle ahead. A perspective deformation of the respective information or of the respective display element can significantly contribute to making it appear as if an information or a display element were part of the surroundings of the vehicle. Contact-analog displays typically require a distance of the virtual image from the driver of more than 10 meters.

Within the scope of this document, symbolic information or display elements is information or are display elements which are not displayed in a contact-analog manner, particularly not in a perspectively distorted manner but, from the driver's view, stand essentially vertically in space. A special case of symbolic information or display elements consists of static information or display elements which are always displayed at the same location within the display surface of the head-up display (customary, for example, for indicating the speed).

It is an object of the present invention to indicate a method which assists the driver of a motor vehicle as much as possible during a driving maneuver.

This object is achieved by a method for the output of graphic driving indications for assisting the driver of a motor vehicle when carrying out a driving maneuver, whereby the graphic driving indications are displayed by a head-up display provided at the motor vehicle. The output of a first graphic driving indication in the form of a traffic lane change indication which points out to the driver the direction from a traffic lane traveled at the beginning of the maneuver to a desired traffic lane is performed. The output of a second graphic driving indication in the form of a contact-analog traffic lane marking which graphically emphasizes the desired traffic lane with respect to other traffic lands is performed. The output of a third graphic driving indication in the form of a contact-analog maneuvering impulse which comprises a driving funnel originating from the desired traffic lane and corresponding to the driving maneuver is provided. And, the output of a fourth graphic driving indication in the form of a symbolic maneuvering display indication which symbolically displays the started driving maneuver after the vehicle enters into the driving funnel is performed.

According to the invention, the steps described in the following are carried out or passed through. A first graphic driving indication in the form of a traffic lane change indication is displayed which indicates to the driver the direction from a traffic lane traveled at the start of the maneuver to a desired traffic lane. In particular, the first traffic lane change indication may be implemented as an arrow or another arrow-type or arrow-like marking. The arrow or marking can be inserted into the driver's field of view particularly such that it points from the currently traveled traffic lane to the desired traffic lane.

According to a preferred embodiment of the present invention, the arrow or the marking is inserted in a contact-analog manner into the driver's field of view, for example, as "lying on the road". The driver's orientation will thereby possibly be aided in an improved manner.

However, as an alternative, the arrow or the marking may also be implemented symbolically, for example, as a plain arrow pointing to the left or right—depending on which side the desired traffic lane is situated with respect to the currently traveled traffic lane. Such a symbolic display is easy to generate, is easily understandable for the driver and, under most circumstances, is entirely sufficient with respect to the driver's orientation for a change of traffic lanes. Mixed forms are also conceivable (i.e. an "almost contact-analog" symbolic first graphic driving indication), for example, a display of an arrow or of an arrow-type or arrow-like marking that, although it is in the correct position (for example, arranged approximately at the boundary of two traffic lanes) is not at the correct attitude (but is standing approximately vertically in space as seen by the driver).

In driving situations, in which the motor vehicle is already situated in the traffic lane that is optimal for the imminent driving maneuver, a symbolic display, such as a straight-ahead arrow—can be emitted to the driver, which informs him that no traffic lane change is necessary.

Following the first graphic driving indication, a second graphic driving indication is emitted in the form of a contact-analog traffic lane marking which graphically emphasizes the desired traffic lane in contrast to other traffic lanes. In particular, the emphasis may consist of a tracing or superimposing of the traffic lane boundaries by lines inserted into the head-up display.

Following the second graphic driving indication, a third graphic driving indication is emitted in the form of a contact-analog maneuvering impulse. This third graphic driving indication comprises a driving funnel starting out from the desired traffic lane and corresponding to the driving maneuver. In particular, the driving funnel can be implemented as a partially transparently colored surface lying on the road (from the driver's field of view).

Following the third graphic driving indication, a fourth graphic driving indication is emitted in the form of a symbolic maneuvering representation indication, which symbolically displays the started driving maneuver after the vehicle has entered the driving funnel. In particular, the fourth graphic driving indication may contain a relatively plain turn-off arrow (in the case of a turn-off maneuver). The fourth graphic driving indication will preferably be displayed until the driving maneuver has been completely concluded.

As a rule, a limiting factor for the display of contact-analog information by the head-up display is the display surface of the head-up display. If available at all, large display surfaces are expensive. Small display surfaces do not permit the display of the respectively situation-adequate information in every situation. The method according to the invention offers the advantage that the display surface of the head-up display is optimally utilized—particularly with respect to the use for contact-analog display contents. As a rule, the contact-analog displays (particularly the second and third graphic driving indication) provided according to the invention during the initiation of the driving maneuver can still easily be accommodated in a limited available display surface. In contrast, during the driving maneuver itself, there is no contact-analog display and the driver continues to be informed nevertheless (fourth graphic indication). The shaping of the second and third graphic driving indication as a traffic lane marking or maneuvering impulse, particularly the suggested preferred embodiments of the above, contribute further to the optimal utilization of the display surface.

The driving maneuver to be carried out is preferably determined by a navigation system of the motor vehicle in a manner known per se. This is based on a route planning that is at least partially precise with respect to the driving or traffic lane as well as on the generating of driving maneuvers or driving indications at the specification level of driving or traffic lanes.

The graphic driving indications emitted according to the invention can be generated by the navigation system itself or by a computer unit of the navigation system. However, one (if necessary, also several) computer unit(s) can also be provided at the vehicle, which computer unit generates the graphic driving indications on the basis of output signals of the navigation system. According to a preferred embodiment of the invention, the head-up display contains a computer unit which generates the graphic driving indications on the basis of input signals which indirectly or directly originate from the navigation system. According to another preferred embodiment of the invention, the head-up display itself is a component of the navigation system, and the computing processes for generating graphic output of the head-up display as well as the computing processes for the route planning and driving maneuver determination run on the same computer unit.

According to a preferred embodiment of the present invention, the first graphic driving indication, the second graphic driving indication, the third graphic driving indication and the fourth graphic driving indication are emitted strictly sequentially without any time-related overlapping of the output of successive driving indications. This simplifies, for example, the generating of the graphic driving indications and the switchover between the driving indications or the transition from one driving indication to the next.

According to another, also advantageous embodiment of the present invention, the first graphic driving indication, the second graphic driving indication, the third graphic driving indication and the fourth graphic driving indication are emitted essentially sequentially. However, the output of at least two mutually successive driving indications will overlap with respect to time. As a result of the time-related overlapping, the driver's attention may, under certain circumstances, be focused more consistently, and/or a more intuitive comprehensibility of the graphic driving indications and their relationship to one another can be achieved.

According to a particularly preferred embodiment of the invention, at least two mutually successive graphic driving indications are transformed into one another by graphic animation. Naturally, such animations can not only be used in the case of one driving indication transition but also in the case of several driving indication transitions; if required, also in the case of all driving indication transitions of the method according to the invention. Depending on the implementation, the animation may require an output that is disjunctive with respect to time or an overlapping with respect to time. Several transitions may be animated differently. However, preferably transitions of the same type are always animated in an identical manner (for example, in different driving situations, the same type of animation is always used for transforming the first driving indication into the second graphic driving indication).

In the case of such an animation, preferably at least one graphic display element of the first-emitted graphic driving indication is deformed in a flowing graphic movement. This deformation will result in an intermediate object which can now be deformed further. This further deformation also preferably takes place in a flowing graphic movement. From this intermediate object, preferably also in a flowing graphic movement, at least one graphic display element will be shaped of the subsequently emitted graphic driving indication.

The display surface of the head-up display can be utilized particularly well if appropriate criteria for the change-over between the individual graphic vehicle indications are defined and checked and if the change-over between the individual graphic driving indications is oriented according to these criteria or their fulfillment.

In particular, during the output of the first graphic driving indication, at least a first change-over criterion concerning the spatial graphic displayability of the second graphic driving indication on the display surface of the head-up display can be checked by a computer unit provided at the motor vehicle. As a function of the fulfillment of this at least one first change-over criterion, a transition can take place from the output of the first graphic driving indication to the output of the second graphic driving indication.

The second graphic driving indication can thereby be emitted, for example, precisely starting at the point in time from which it can be displayed on the display surface of the head-up display in a completely and/or intuitively comprehensible or visually detectable manner.

The checking of the fulfillment of the criterion can take place, for example, in a periodically repetitive fashion. However, in addition or as an alternative, it may take place in an event-triggered manner, for example, as a function of one or more predefined values of the residual distance from the driving maneuver. The above-mentioned checking computer unit preferably—however, not necessarily—is the one that also generates the graphic driving indications.

It may also be advantageous to check, during the output of the second graphic driving indication, preferably also in a continuous and/or event-triggered manner, at least a second change-over criterion concerning the spatial graphic displayability of the third graphic driving indication on the display surface of the head-up display and, as a function of the fulfillment of the at least second criterion, change from the output of the second graphic driving indication to the output of the third graphic driving indication.

The third graphic driving indication can therefore also be emitted, for example, precisely starting from the point in time as of which it can be displayed completely and/or intuitively comprehensibly or visually detectably on the display surface of the head-up display.

Furthermore, it may be advantageous to check, during the output of the third graphic driving indication, at least a third criterion concerning the spatial graphic displayability of the third graphic driving indication on the display surface of the head-up display and, as a function of the fulfillment of the at least third change-over criterion, change from the output of the third graphic driving indication to the output of the fourth graphic driving indication.

The third graphic driving indication can therefore be emitted, for example, as long as it can be displayed on the display surface of the head-up display in a completely and/or intuitively comprehensible or visually detectable manner.

The above-mentioned change-over criteria concerning the spatial graphic displayability of graphic driving indications on the display surface of the head-up display can be defined differently. In the simplest case, the display contents of the respective graphic driving indication are first computed irrespective of the limited display surface, and it is only checked in a subsequent step whether the computed display contents can be displayed on the display surface completely or in a minimal proportion. In the case of several display contents, the minimum proportion may relate to each individual display content or to the totality of display contents. In the latter case, the individual display contents, if required, may also be weighted differently.

As an alternative, a simple criterion to be checked can also be derived from the previously known size of the display surface and the previously known shape of a graphic driving indication to be emitted for a certain driving maneuver, for example, a value of the distance to the implementation point of the driving maneuver. As required, such a criterion may include the type of the driving maneuver and/or the utilization of the desired traffic lane or the lateral distance to the desired traffic lane. For example, when the motor vehicle is driving in the desired traffic lane and it is between zero meters and 30 meters away from the implementation point of a left turn-off driving maneuver, it is concluded that the third graphic driving indication can be completely or almost completely displayed on the display surface, and a transition can be made from the second to the third driving indication.

If required, a minimum display duration and/or a minimum display route of the first emitted driving indication can be taken into account as a further criterion for the change-over between two mutually successive graphic driving indications. As a modified example, when the motor vehicle is driving in the desired traffic lane and is between zero meters and 30 meters away from the implementation point of a left turn-off driving maneuver, it is concluded that the third graphic driving indication can be completely or almost completely displayed on the display surface, and a transition is made from the second to the third driving indication, if the second graphic driving indication has previously been displayed for at least three seconds (minimum display duration) and/or on a driving route of at least 20 meters (minimum display route). A minimum display duration and/or minimum display route can also be defined as a function of a probably remaining display duration or display route of the driving indication to which the transition is made.

At least one graphic driving indication, particularly the third graphic driving indication, can especially advantageously be used for the display of additional information. Thus, for example, the switching state of at least one traffic light system influencing the driving maneuver can be detected, and the color characteristic of the third graphic driving indication can be selected as a function of the switching state and can be changed when the switching state changes. When it is detected, for example, that a traffic light, which the vehicle is approaching, is switched to green (the detection can, for example, take place by a camera that is provided at the motor vehicle and has an image processing system on the output side, and/or on the basis of a wireless communication of the switching state), the third graphic driving indication may be displayed in green, particularly as a green driving funnel. When the switching state of the traffic light changes to red, the driving indication or driving funnel will be colored red. In addition to the coloring of the contact-analog representation, a display can be inserted into the head-up display which, possibly together with an icon corresponding to the respective traffic light phase (for example, a "red traffic light" icon), which conveys to the driver the remaining time (for example, in seconds) in the current traffic light phase or to the next traffic light phase.

The invention is based, among other things, on the findings described in the following.

Navigation and guidance approaches known from the state of the art lead the driver by means of lane recommendations and turn-off indications along his selected route. These indications are presented to the driver in various forms. The use of voice indications, map displays with an outlined course of the route as well as a symbolic abstract representation of the respective required driving maneuvers for following the selected route are customary. In addition, in the case of some fairly new system designs, the driver receives information in an abstract symbolic form concerning optimal traffic lanes or driving lanes at selected intersections.

Navigation systems are also known which present to the driver an abstract 3D model of the travel setting, in which the rough course of the current route is displayed. Video images of the road situation in front of the vehicle with a superimposed three-dimensional representation of the rough course of the route and/or a driving funnel originating from one's own motor vehicle are presented to the driver by other known systems.

The classic guidance approaches have the disadvantage that the driver is constantly forced to project the indications provided to him onto the current road situation. He therefore always has to establish a linkage between the abstract symbolic representation of the navigation information and the real surroundings. As soon as there are discrepancies between the represented information and the real situation on the road, it will be considerably more difficult for the driver to establish this linkage. The driver has to establish this linkage parallel to the driving tasks of stabilizing and maneuvering. However, for fulfilling these driving tasks, the driver should ideally concentrate on what is happening on the road.

Systems which present to the driver a video image with superimposed navigation information oftentimes give the false impression of a comprehensive overview of the traffic situation, even if the driver's attention is drawn to the displays of the device. As a result of the possible time-related staggering of the displayed signals with respect to reality and/or the possibly complete or partial overlapping of important traffic elements in the video image because of superimposition and/or the sometimes high dynamics of superimposition, a truly comprehensive impression of the real traffic situation, however, can also not be provided to the driver by such systems.

An important characteristic of the inventive display in comparison to classic guiding approaches is the addition of a detailed driving lane or traffic lane guidance. The routing can, among other things, be simplified by the fact that, in principle, the driver at first only has to be guided onto the optimal traffic lane or along the optimal traffic lane. Subsequently, the driver will be informed as to when he has to leave the current traffic lane for a turn-off maneuver. For this purpose, the driver only has to receive a small amount of information, for example, the location or point in time of the maneuver, for example, "turn off now". In addition, the driving maneuvers potentially possible for the driver will be reduced because only selected driving maneuvers are permitted in the individual traffic lanes.

An additional important characteristic of the inventive display is the displaying of contact-analog information by a head-up display.

In the following, a preferred embodiment of the invention will be described by means of the attached drawings. This description provides further details, preferred embodiments and further developments of the invention.

DETAILED DESCRIPTION OF THE DRAWINGS

It is assumed that a motor vehicle has a navigation system and a head-up display (HUD). Graphic driving indications can be emitted by the head-up display for aiding a driver of the motor vehicle when carrying out a driving maneuver. A relatively large-surface head-up display (at least 15° H and 5° V) is used in this case, which permits a contact-analog representation.

Additional display possibilities in the central information display as well as in the instrument cluster of the motor vehicle can be used in a supplementary fashion but are no characteristic component of the inventive display introduced here. For example, overview knowledge in the form of map displays or situation representations can be presented as forecasting information to the driver in the central information display or in the instrument cluster.

The inventive display in the head-up display that is in the foreground here is used for presenting direct acting instructions to the driver. It comprises a number of successive outputs.

Step 1 is the output of a symbolic display of the necessity of a traffic or driving lane change (first graphic driving indication in the form of a traffic lane change indication which indicates to the driver the direction from a traffic lane traveled at the start of the maneuver to a desired traffic lane). The display aids the driver in arriving in the traffic lane optimal for the selected route.

Figure 1:
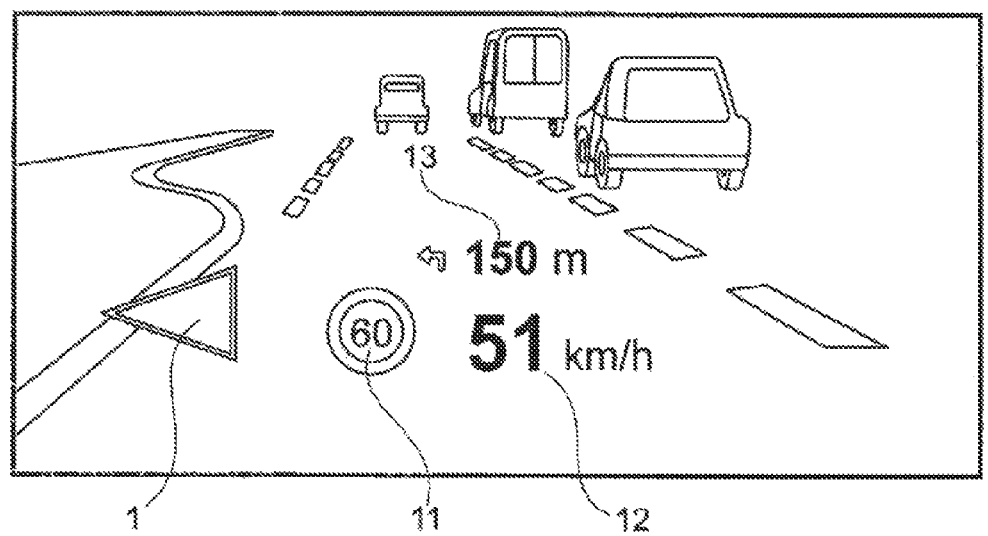
FIG. 1 is a schematic view of a first graphic driving indication as seen by the driver.

FIG. 1 illustrates a preferred embodiment of such a first graphic driving indication. In this case, the first graphic driving indication is constructed as a plain symbolic triangular arrow 1. The additional displays shown in the head-up display (speed limit 11, speed 12, distance to the maneuvering point 13) and their purpose are known per se from the state of the art and will therefore not further be discussed in detail.

If, in contrast to the above example, the motor vehicle is already situated in the optimal traffic lane, a symbolic display will be emitted to the driver which informs him that no traffic lane change is necessary.

Step 2 is the subsequent output of a contact-analog marking of the optimal traffic lane or optimal driving lane. The marking (second graphic driving indication in the form of a contact-analog traffic lane marking, which graphically emphasizes the desired traffic lane in contrast to other traffic lanes) provides the driver with a direct visual feedback as to whether the vehicle is in the optimal driving lane or traffic lane.

Figure 2:
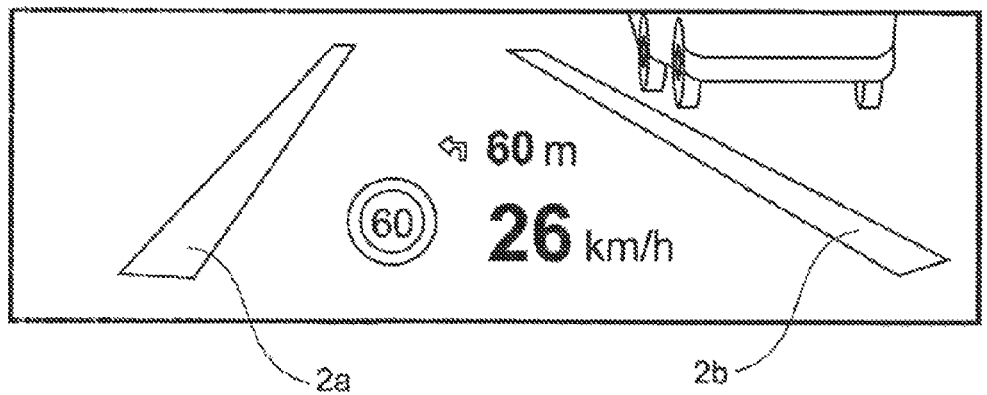
FIG. 2 is a schematic view of a second graphic driving indication as seen by the driver.

FIG. 2 illustrates a preferred embodiment of such a second graphic driving indication. In this case, the second graphic driving indication comprises two marking bars 2a and 2b which (approximately in superimposition of the actual traffic lane markings) border the desired traffic lane on the left and the right.

Step 3 is the output of a contact-analog maneuvering impulse (third graphic driving indication in the form of a contact-analog maneuver impulse, which comprises a driving funnel originating from the desired traffic lane and corresponding to the driving maneuver). The output of the maneuvering impulse is used for the initiation of the required maneuver for following the selected route.

Figure 3:
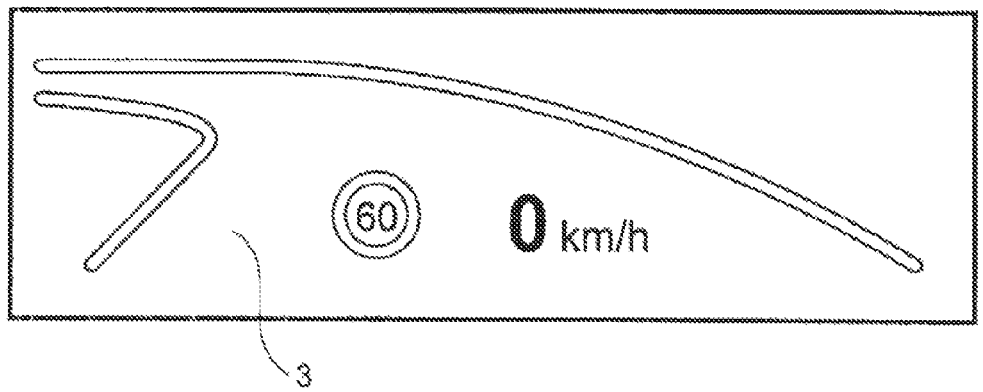
FIG. 3 is a schematic view of a third graphic driving indication as seen by the driver.

FIG. 3 illustrates a preferred embodiment of such a third graphic driving indication. In this case, the maneuvering impulse is constructed as a driving funnel 3 which covers the portion of the road surface to be traveled within the scope of the driving maneuver in a partially transparent fashion in the manner of a carpet.

Step 4 is the output of a symbolic representation of the maneuver itself (fourth graphic driving indication in the form of a symbolic maneuver representation indication which symbolically displays the starting driving maneuver after the vehicle has entered the driving funnel).

Figure 4:
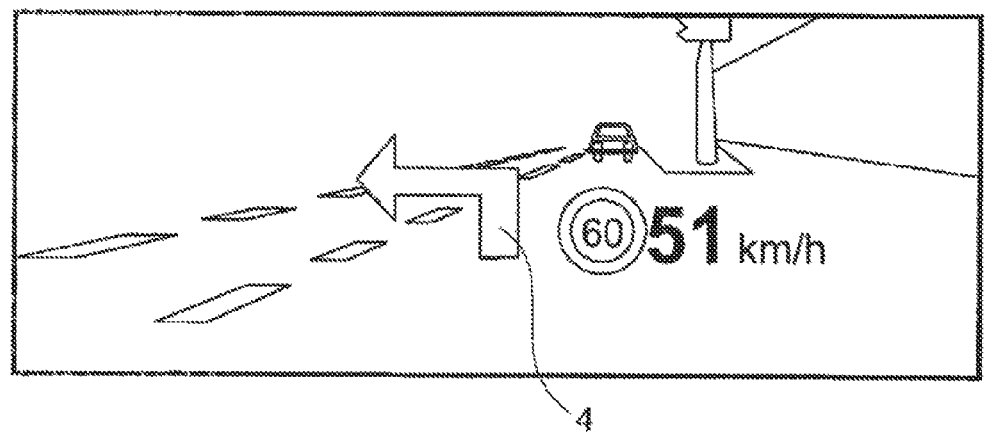
FIG. 4 is a schematic view of a fourth graphic driving indication as seen by the driver.

FIG. 4 illustrates a preferred embodiment of such a fourth graphic driving indication. In the present example, the fourth graphic driving indication is constructed as a plain arrow 4.

The transitions between the steps or driving indications or the display elements displayed in the process are shown by use of animations. In the case of these transitions, symbolic display elements are converted to contact-analog display elements and vice-versa. These animations are an optional but extremely advantageous component of the display concept because they can be used for drawing the driver's attention for a short time to situation-related driving-relevant maneuvering details.

In the following, the general sequence will be described over the course of a maneuver.

As soon as the driver approaches the maneuvering point of a necessary guiding maneuver, he is first informed that a maneuver should soon be expected. For this purpose, an acoustic indication as well as a pictograph representation of the maneuver is presented to the driver in a manner known per se together with an indication of the distance to the maneuvering point.

Subsequently, the driver will be prepared for the maneuver in that he is guided into the optimal traffic lane (or receives the indication that he is already situated in the optimal traffic lane, in order to prevent him from leaving it again). Because of the limited area for possible contact-analog displays, not all instructions can be displayed to the driver at any time in a purely contact-analog manner. As a result, all required traffic lane changes are initiated by use of abstract symbols at the 2D-HUD level. These symbols point in the respective direction of the traffic lane change (compare FIG. 5, first graphic driving indication 5, constructed here as a multiple arrow). The driver therefore knows into which traffic lane he should steer his vehicle.

Figure 5:
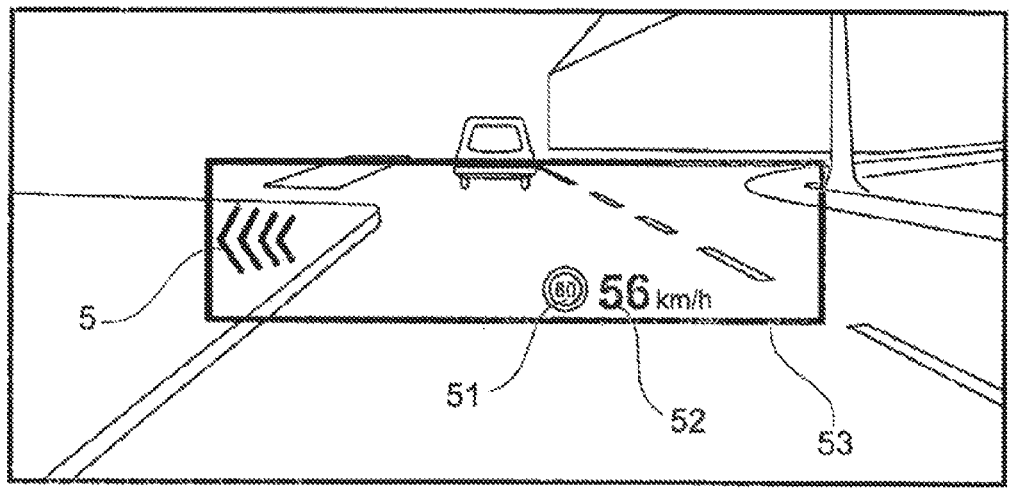
FIG. 5 is a schematic view of a first snapshot of a graphic animation during the transition from a first graphic driving indication to a second graphic driving indication.
Figure 6:
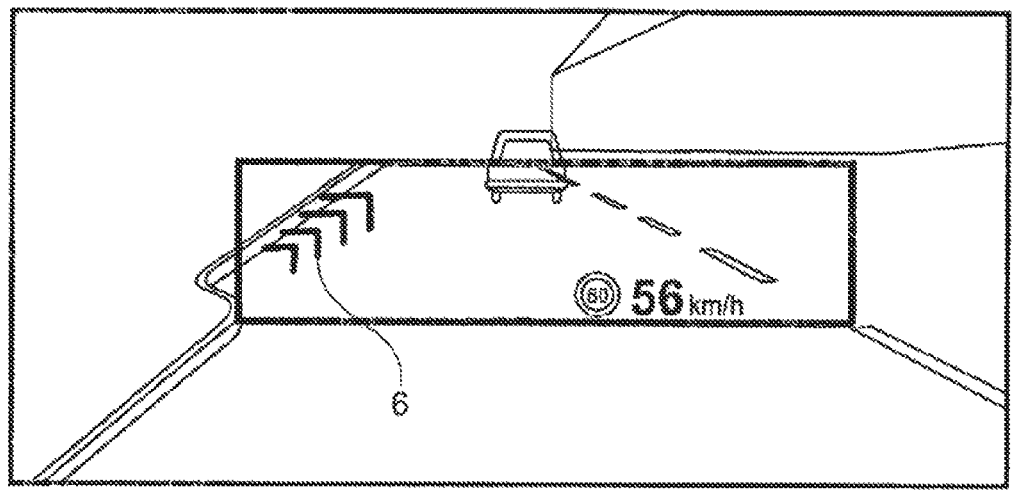
FIG. 6 is a schematic view of a second snapshot of the same graphic animation.
Figure 7:
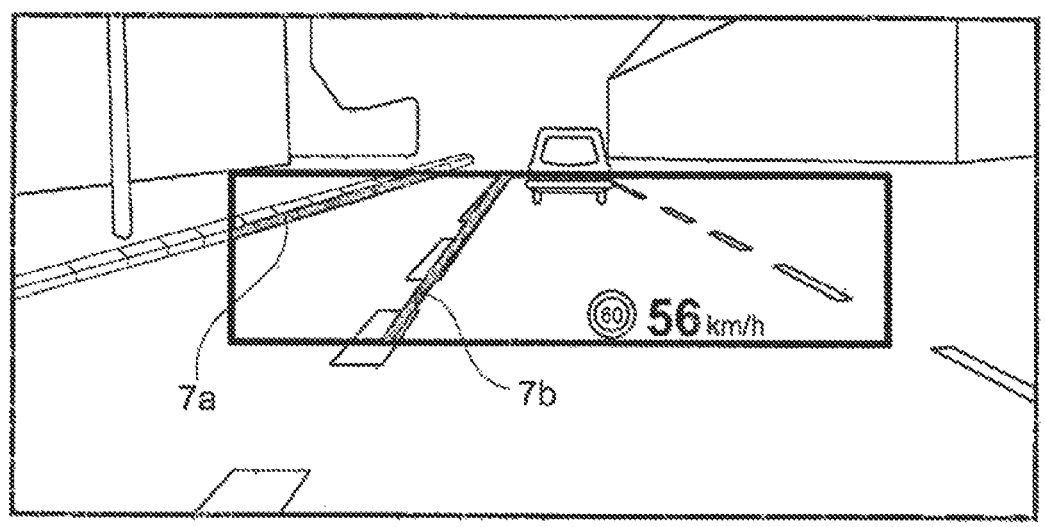
FIG. 7 is a schematic view of a third snapshot of the same graphic animation.

As soon as the markings or boundaries of the optimal traffic lane are in the displayable area of the head-up display, the abstract traffic lane change symbol will change into the contact-analog marking of this traffic lane (compare FIG. 7, second graphic driving indication in the form of two traffic lane markings 7a and 7b). This transformation is visualized by a graphic animation. In this case, in a rotating movement of the original symbol 5, the two traffic lane borders on the left and the right "grow" out of the symbol 5, starting from symbol 5 toward the horizon (see FIGS. 5, 6 and 7). In the meantime, an intermediate object 6 is created, which is already rotated and stretched with respect to the symbol 5. A short time after the snapshot according to FIG. 6, the intermediate object 6 will be split and the two traffic lane markings 7a and 7b are created. FIGS. 5, 6 and 7 are to be understood as snapshots. FIG. 5 shows a first snapshot of the graphic animation; FIG. 6 shows a second snapshot of the same graphic animation; and FIG. 7 shows a third snapshot of the same graphic animation.

When the driver is situated in the recommended traffic lane, he can follow this lane until he reaches the maneuver. As soon as he approaches the site of the maneuver, for example, the corresponding intersection, a maneuvering impulse is presented to him (third graphic driving indication).

This maneuvering impulse is also built up in a brief animation, specifically in steps, from the two traffic lane markings on the left and right. The steps of the step-by-step buildup are preferably selected to be so narrow that, as seen by the driver, a flowing movement and deformation is obtained. The dynamics of the animation inform the driver of the closeness of the maneuver and isochronously direct his attention to the site of the maneuver.

If, as a result of the limited display space, the contact-analog maneuvering impulse leaves the display surface of the head-up display or if it can no longer be displayed because of the limited display surface, a symbolic turn-off indication will occur again in a certain projection. As a result of the occurring dynamic display transition, the driver's attention will be directed to the (for example, 3-second) projection range.

The invention contributes significantly to improving the assistance to the driver of a motor vehicle by contact-analog displays of a head-up display. The invention takes into account the fact that in practice it is not possible at reasonable expenditures to expand the display area available for contact-analog displays to a theoretically required or desirable size (for example, the entire windshield and possibly even parts of the side windows). The introduced display concept solves the problem of the limited surface for the display of contact-analog information in current and also future head-up displays in surroundings of automobiles. Each driving maneuver representation provided in the introduced display concept arises from the symbolic 2D image level in the head-up display and also ends in it again. By means of clear-cut animations, the driver can always be informed as of when contact-analog representations are present and possible. An unnecessary and distracting searching for contact-analog displays is therefore eliminated. The fact that the navigation instructions are not constantly presented but only when they are relevant to the driver, additionally reduces the dynamics in the driver's direct perception range. An unnecessary linkage of the driver's attention is thereby prevented or reduced. As a result of the suggested measures, the introduced display concept can already be implemented by using head-up displays which offer an only relatively small display area for contact-analog representations.

The invention claimed is:

1. A method for outputting graphic driving indications for assisting a driver of a motor vehicle in carrying out a driving maneuver, the method comprising the acts of:
   outputting a first graphic driving indication on a head-up display provided at the motor vehicle, the first graphic driving indication comprising a symbolic display element and being in a form of a traffic lane change indication pointing out to the driver a direction from a traffic lane traveled at a beginning of the driving maneuver to a desired traffic lane;
   outputting a second graphic driving indication on the head-up display, the second graphic driving indication being in a form of a contact-analog traffic lane marking graphically emphasizing the desired traffic lane with respect to other traffic lanes;
   outputting a third graphic driving indication on the head-up display, the third graphic driving indication being in a form of a contact-analog maneuvering impulse comprising a driving funnel originating from the desired traffic lane and corresponding to the driving maneuver; and
   outputting a fourth graphic driving indication on the head-up display, the fourth graphic driving indication being in a form of a symbolic maneuvering display indication that symbolically displays the beginning driving maneuver after the motor vehicle enters into the driving funnel,
   during the outputting of the first graphic driving indication, at least a first change-over criteria concerning a spatial graphic displayability of the second graphic driving indication on a display surface of the head-up display is checked via a computer unit provided at the motor vehicle; and
   in response to the at least first change-over criteria indicating that second graphic driving indication would be displayable within a displayable area of the heads-up display, a transition is made from the outputting of the first graphic driving indication to the outputting of the second graphic driving indication.

2. The method according to claim 1, wherein the outputting of the first to fourth graphic driving indications is carried out successively.

3. The method according to claim 2, wherein the first graphic driving indication consists only of symbolic display elements.

4. The method according to claim 3, wherein the outputting of the first to fourth graphic driving indications occurs sequentially without any time-related overlapping of the outputting of successive driving indications.

5. The method according to claim 3, wherein the outputting of the first to fourth graphic driving indications occurs sequentially, wherein an output of at least two successive driving indications overlap with respect to time.

6. The method according to claim 3, wherein the outputting of two successive graphic driving indications is carried out by transforming a first of said two successive graphic driving indications into a second of said two successive graphic driving indications via graphic animation, and
   wherein at least one graphic display element of a first displayed graphic driving indication is formed in a flowing graphic movement, and
   wherein at least one graphic display element of a subsequently displayed graphic driving indication is formed in a flowing graphic movement from an intermediate object arising from the deforming of the at least one graphic display element of the first displayed graphic driving indication.

7. The method according to claim 2, wherein the outputting of two successive graphic driving indications is carried out by transforming a first of said two successive graphic driving indications into a second of said two successive graphic driving indications via graphic animation, and
- wherein at least one graphic display element of a first displayed graphic driving indication is formed in a flowing graphic movement, and
- wherein at least one graphic display element of a subsequently displayed graphic driving indication is formed in a flowing graphic movement from an intermediate object arising from the deforming of the at least one graphic display element of the first displayed graphic driving indication.

8. The method according to claim 7, further comprising the acts of:
- detecting a switching state of at least one traffic light system influencing the driving maneuver; and
- selecting a color characteristic of the third graphic driving indication as a function of the switching state and changing the color characteristic when a change in the switching state occurs.

9. The method according to claim 1, wherein the outputting of the first to fourth graphic driving indications occurs sequentially without any time-related overlapping of the outputting of successive driving indications.

10. The method according to claim 1, wherein the outputting of the first to fourth graphic driving indications occurs sequentially, wherein an output of at least two successive driving indications overlap with respect to time.

11. The method according to claim 1, wherein:
- during the outputting of the second graphic driving indication, at least a second change-over criteria concerning the spatial graphic displayability of the third graphic driving indication on the display surface of the head-up display is checked; and
- as a function of whether the at least second change-over criteria is satisfied, a transition is made from the outputting of the second graphic driving indication to the outputting of the third graphic driving indication.

12. The method according to claim 11, wherein:
- during the outputting of the third graphic driving indication, at least a third change-over criteria concerning the spatial graphic displayability of the third graphic driving indication on the display surface of the head-up display is checked, and
- in response to the at least third change-over criteria indicating that the third graphic driving indication is no longer displayable within the displayable area of the heads-up display, a transition is made from the outputting of the third graphic driving indication to the outputting of the fourth graphic driving indication.

13. The method according to claim 12, further comprising the acts of:
- detecting a switching state of at least one traffic light system influencing the driving maneuver; and
- selecting a color characteristic of the third graphic driving indication as a function of the switching state and changing the color characteristic when a change in the switching state occurs.

14. The method according to claim 11, further comprising the acts of:
- detecting a switching state of at least one traffic light system influencing the driving maneuver; and
- selecting a color characteristic of the third graphic driving indication as a function of the switching state and changing the color characteristic when a change in the switching state occurs.

15. The method according to claim 1, further comprising the acts of:
- detecting a switching state of at least one traffic light system influencing the driving maneuver; and
- selecting a color characteristic of the third graphic driving indication as a function of the switching state and changing the color characteristic when a change in the switching state occurs.

* * * * *